US012734518B2

(12) United States Patent
Choi et al.

(10) Patent No.: US 12,734,518 B2
(45) Date of Patent: Sep. 15, 2026

(54) ANTIMICROBIAL SUSCEPTIBILITY TESTING DEVICE, ANTIMICROBIAL SUSCEPTIBILITY TESTING METHOD USING THE TESTING DEVICE AND SYSTEM INCLUDING THE TESTING DEVICE

(71) Applicant: QuantaMatrix Inc., Seoul (KR)

(72) Inventors: Jung Il Choi, Seoul (KR); Sun Jae Hwang, Seoul (KR)

(73) Assignee: QuantaMatrix Inc., Seoul (KR)

( * ) Notice: Subject to any disclaimer, the term of this patent is extended or adjusted under 35 U.S.C. 154(b) by 688 days.

(21) Appl. No.: 18/032,756

(22) PCT Filed: Sep. 28, 2021

(86) PCT No.: PCT/KR2021/013207
§ 371 (c)(1),
(2) Date: Apr. 19, 2023

(87) PCT Pub. No.: WO2022/092586
PCT Pub. Date: May 5, 2022

(65) Prior Publication Data

US 2023/0405578 A1 Dec. 21, 2023

(30) Foreign Application Priority Data

Oct. 28, 2020 (KR) ........................ 10-2020-0141017

(51) Int. Cl.
*B01L 1/00* (2006.01)
*B01L 3/00* (2006.01)

(52) U.S. Cl.
CPC ....... *B01L 3/502* (2013.01); *B01L 2200/0636* (2013.01); *B01L 2300/0663* (2013.01);
(Continued)

(58) Field of Classification Search
None
See application file for complete search history.

(56) References Cited

U.S. PATENT DOCUMENTS

2009/0233805 A1 9/2009 Hayashi et al.
2016/0038939 A1* 2/2016 Min .................. B01L 3/502738 422/502

(Continued)

FOREIGN PATENT DOCUMENTS

EP 2128614 A1 12/2009
JP 2005030906 A 2/2005

(Continued)

OTHER PUBLICATIONS

International search report of PCT/KR2021/013207, Jan. 24, 2022, English translation.

(Continued)

*Primary Examiner* — Jyoti Mutreja
(74) *Attorney, Agent, or Firm* — STIP Law Group, LLC

(57) ABSTRACT

An antimicrobial susceptibility testing device according to an embodiment of the present invention includes a substrate and a driving unit rotating the substrate. The substrate includes first injection holes formed so as to penetrate the upper surface thereof and channels forming passages therein through which antibiotics, a bacteria sample or mixed solutions thereof injected through the first injection holes are movable and having first regions where the mixed solutions are concentrated and localized by centrifugal force applied when the substrate is rotated by the driving unit.

15 Claims, 5 Drawing Sheets

(52) U.S. Cl.
CPC . *B01L 2300/0803* (2013.01); *B01L 2300/087* (2013.01); *B01L 2400/0409* (2013.01)

(56) References Cited

U.S. PATENT DOCUMENTS

| | | | |
|---|---|---|---|
| 2016/0289729 A1 | 10/2016 | Richards et al. | |
| 2019/0374948 A1 | 12/2019 | Avesar et al. | |
| 2020/0306755 A1* | 10/2020 | Chang .................. | G02B 21/241 |

FOREIGN PATENT DOCUMENTS

| | | | |
|---|---|---|---|
| JP | 2012076017 | A | 4/2012 |
| KR | 20070041021 | A | 4/2007 |
| KR | 100818290 | B1 | 3/2008 |
| KR | 20090118749 | A | 11/2009 |
| KR | 20100007809 | A | 1/2010 |
| KR | 101398764 | B1 | 5/2014 |
| WO | WO2019234654 | A1 | 12/2019 |

OTHER PUBLICATIONS

Tang et al, A linear concentration gradient generator based on multi-layered centrifugal microfluidics and its application in antimicrobial susceptibility testing, Lab on a Chip, 2018, pp. 1452-1460, vol. 18, issue 10.

Litvinov et al, Centrifugal sedimentation immunoassays for multiplexed detection of enteric bacteria in ground water, Biomicrofluidics, 2016, pp. 1-9, vol. 10, issue 1.

Kim et al, Miniaturized Antimicrobial Susceptibility Test by Combining Concentration Gradient Generation and Rapid Cell Culturing, 2015, pp. 455-466, vol. 4, issue 4.

* cited by examiner

[FIG. 1]
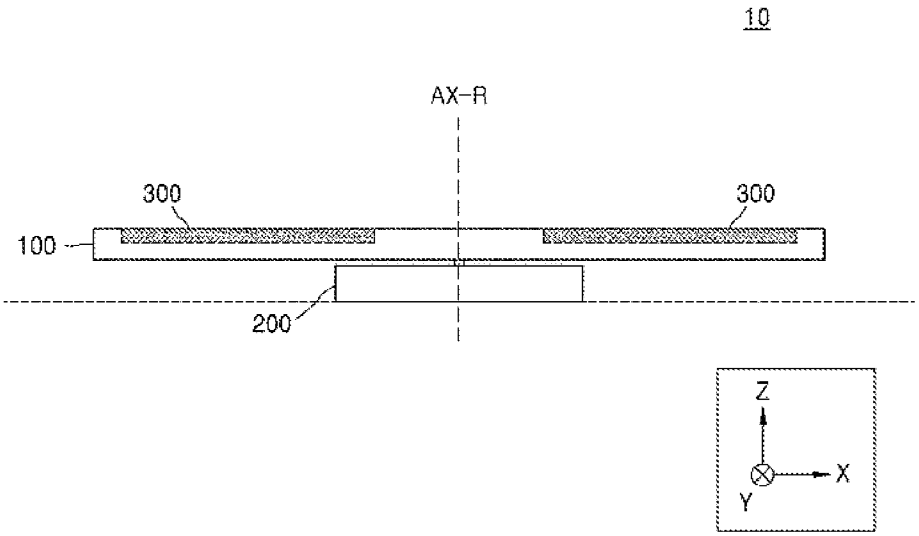
[FIG. 2]
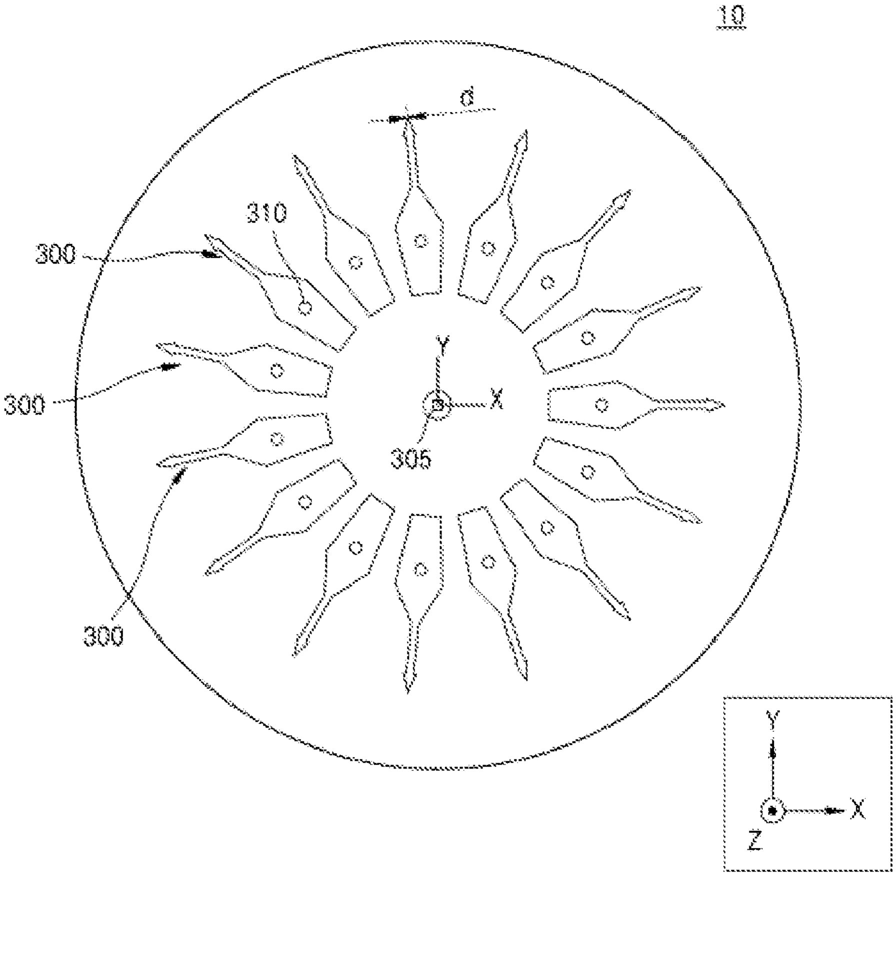

[FIG. 3]
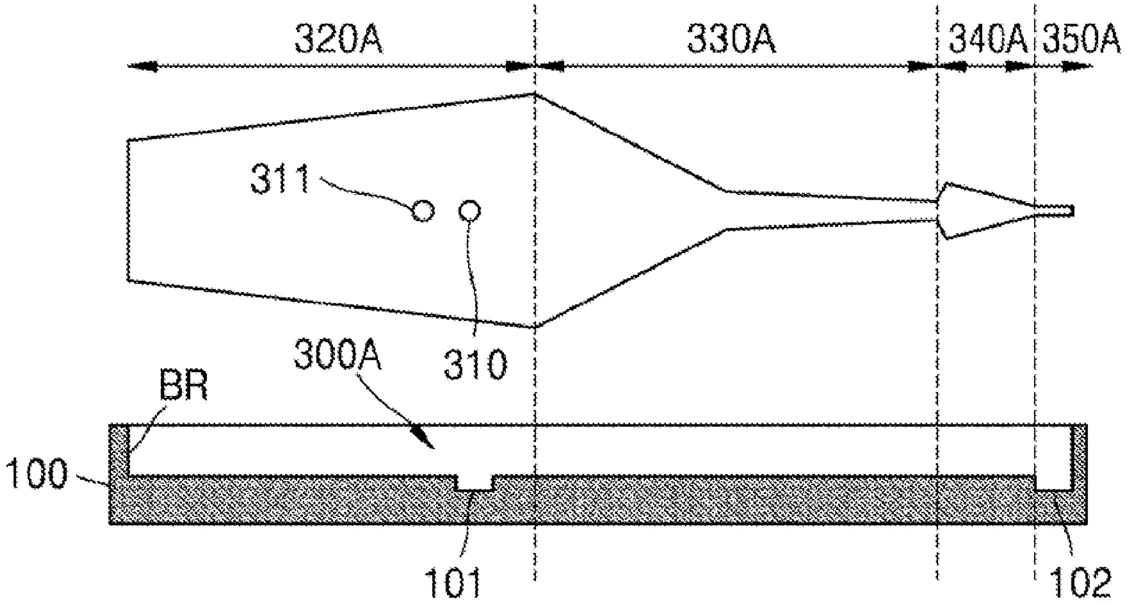
[FIG. 4]
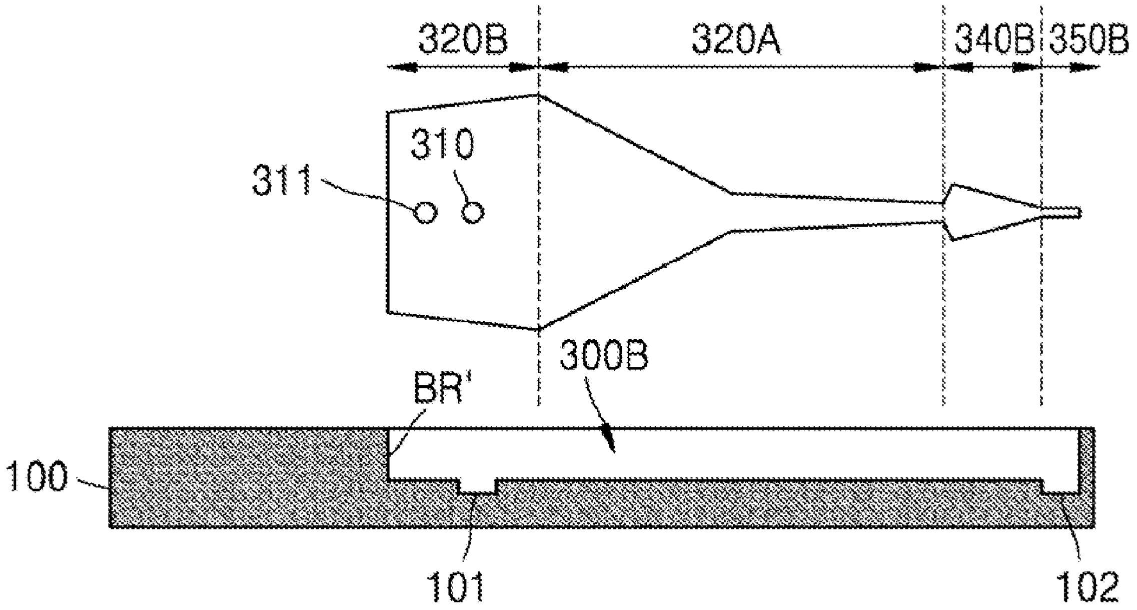

[FIG. 5]
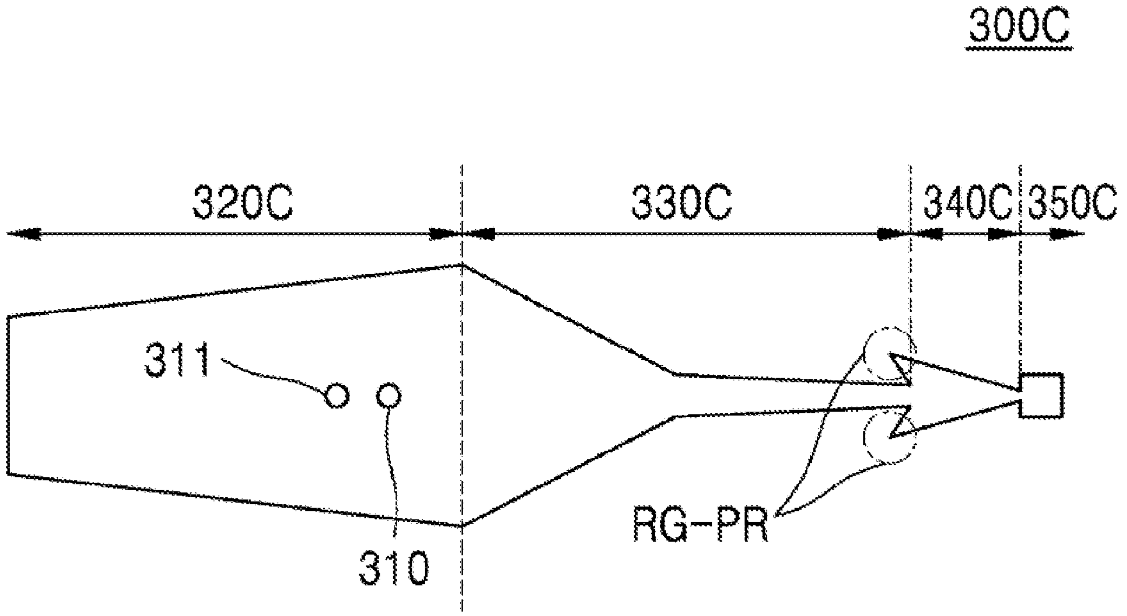
[FIG. 6]
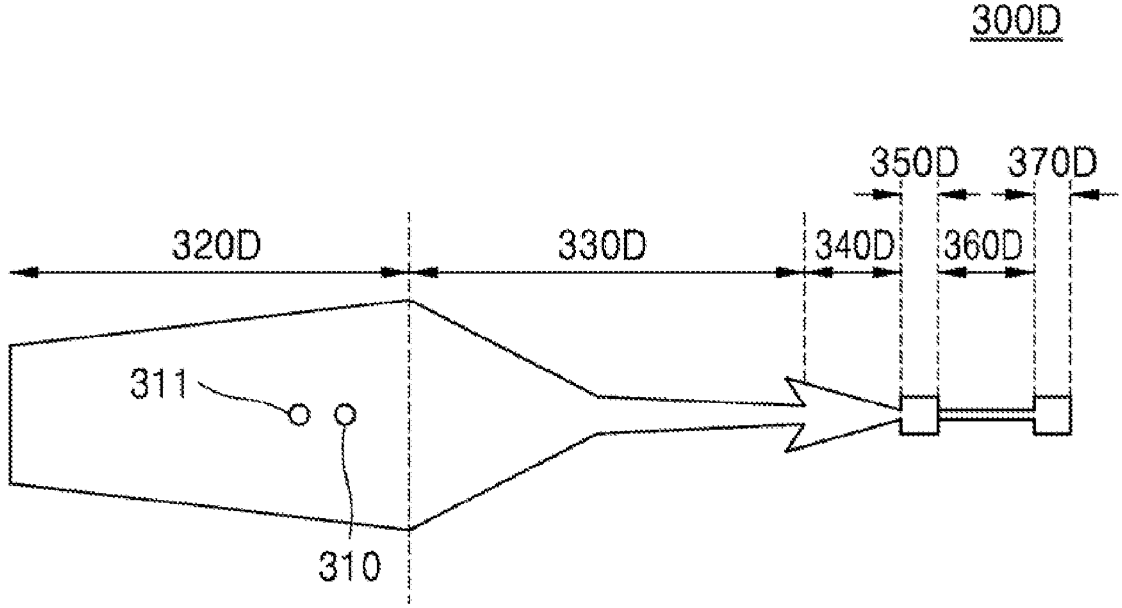

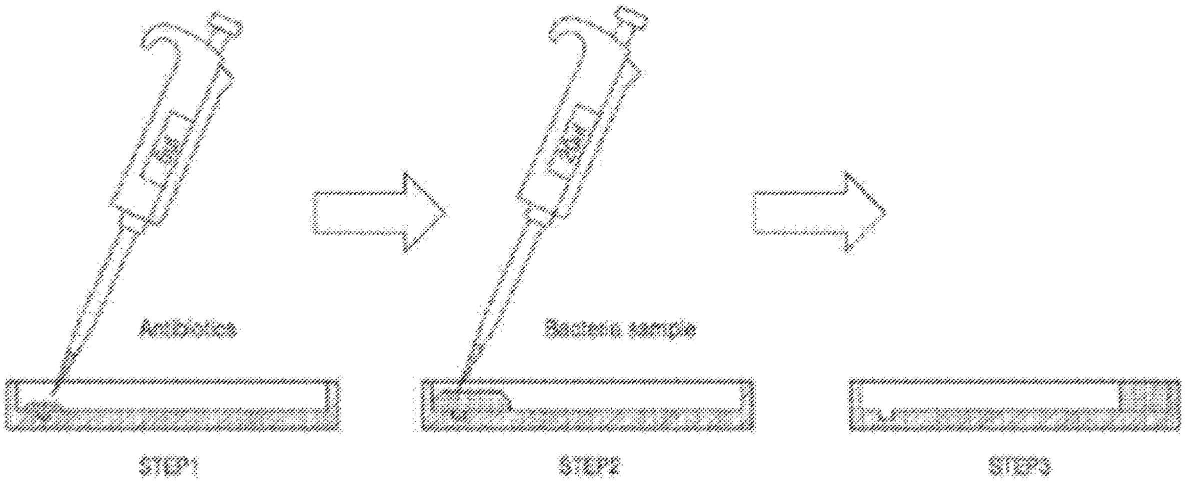
[FIG. 7]

[FIG. 8]
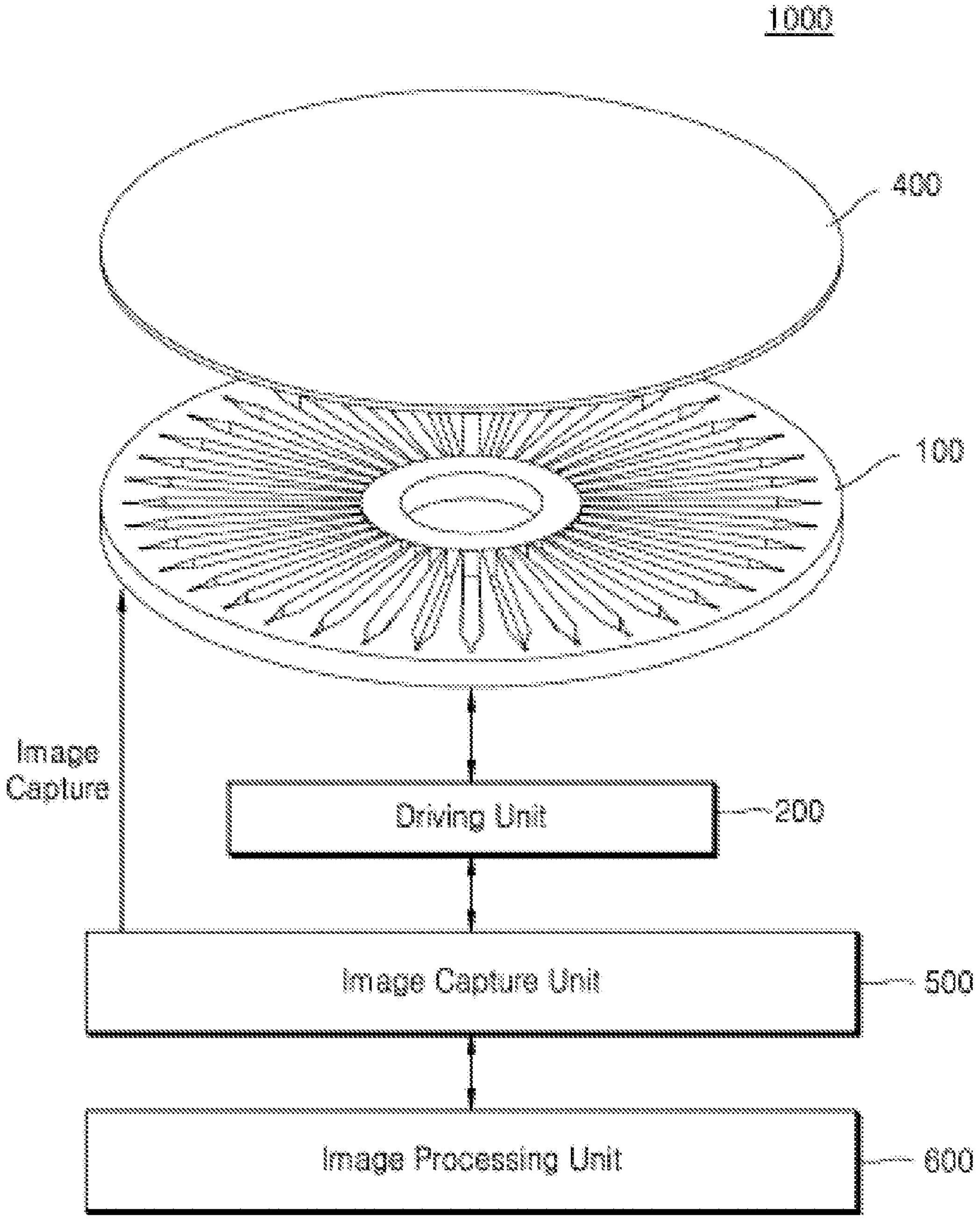

ANTIMICROBIAL SUSCEPTIBILITY TESTING DEVICE, ANTIMICROBIAL SUSCEPTIBILITY TESTING METHOD USING THE TESTING DEVICE AND SYSTEM INCLUDING THE TESTING DEVICE

CROSS-REFERENCE TO RELATED APPLICATIONS

This application is the U.S. National Phase under 35 U.S.C. § 371 of International Application No. PCT/KR2021/013207, filed on Sep. 28, 2021, which in turn claims the benefit of Korean Application No. 10-2020-0141017, filed on Oct. 28, 2020, the disclosures of which are incorporated by reference into the present application.

TECHNICAL FIELD

The present invention relates to an antimicrobial susceptibility testing device, an antimicrobial susceptibility testing method using the testing device, and a system including the testing device. More specifically, the present invention relates to an antimicrobial susceptibility testing device in which mixed solutions of antibiotics and small amounts of a bacteria sample are concentrated and localized in limited regions by centrifugal force, an antimicrobial susceptibility testing method using the testing device, and a system including the testing device.

BACKGROUND ART

Infectious diseases caused by pathogenic bacteria claim many lives every year. Antibiotics have been developed to treat infectious diseases. Although antibiotics have saved the lives of many patients with infectious diseases, their indiscriminate use has increased the emergence of antibiotic-resistant strains.

As the number of resistant strains increases, it is necessary to preferentially determine to which antibiotics the infecting strains are resistant in order to treat patients with infectious diseases. A test to determine the resistance of strains to antibiotics is called an antimicrobial susceptibility test (AST). The basic principle of the antimicrobial susceptibility test is to determine whether test strains grow in the presence of antibiotics.

DETAILED DESCRIPTION OF THE INVENTION

Technical Problems

The present invention is intended to provide an antimicrobial susceptibility testing device in which mixed solutions of antibiotics and small amounts of a bacteria sample are concentrated and localized in limited regions by centrifugal force, an antimicrobial susceptibility testing method using the testing device, and a system including the testing device.

Means for Solving the Problems

An antimicrobial susceptibility testing device according to one embodiment of the present invention includes a substrate and a driving unit rotating the substrate wherein the substrate includes first injection holes formed so as to penetrate the upper surface thereof and channels forming passages therein through which antibiotics, a bacteria sample or mixed solutions thereof injected through the first injection holes are movable and having first regions where the mixed solutions are concentrated and localized by centrifugal force applied when the substrate is rotated by the driving unit.

According to one exemplary embodiment, each of the channels may have a second region including a section whose width becomes narrower toward the first region such that the mixed solution is localized in the first region.

According to one exemplary embodiment, the second region may further include a section whose width becomes narrower opposite the first region and which prevents the introduced mixed solution from flowing backward.

According to one exemplary embodiment, the width of the first region may be the same as that of one end of the second region and may be uniform.

According to one exemplary embodiment, the width of the first region may be larger than that of one end of the second region and may be uniform.

According to one exemplary embodiment, the second region may further include a section protruding opposite the first region.

According to one exemplary embodiment, each of the channels may have a third region including a section whose width becomes narrower toward the second region such that the mixed solution is transferred to the second region when the applied centrifugal force is equal to or greater than a reference value.

According to one exemplary embodiment, when the mixed solution contains a plurality of bacterial strains, the channel may have a fourth region in which a bacterial strain different from a bacterial strain localized in the first region is localized.

According to one exemplary embodiment, each of the channels may include a fifth region connecting between the first region and the fourth region.

According to one exemplary embodiment, the width of the fifth region may be narrower than those of the first region and the fourth region.

According to one exemplary embodiment, the width of the fifth region may be set such that bacterial strains of different sizes are localized in the first region and the fourth region.

According to one exemplary embodiment, the antimicrobial susceptibility testing device may further include second injection holes formed so as to penetrate the upper surface of the substrate.

According to one exemplary embodiment, the second injection holes may be formed at positions closer to the axis of rotation of the substrate than the first injection holes through which the antibiotics are injected, and the bacteria sample may be injected through the second injection holes.

According to one exemplary embodiment, recesses may be formed at positions corresponding to the first injection holes on the bottom surfaces of the channels.

According to one exemplary embodiment, recesses may be formed at positions corresponding to the first regions on the bottom surfaces of the channels.

An antimicrobial susceptibility testing method according to a further embodiment of the present invention includes: injecting antibiotics into channels formed in a substrate and drying the antibiotics; mixing a bacteria sample with the dried antibiotics injected into the channels; and rotating the substrate to apply centrifugal force to the mixed solutions of the antibiotics and the bacteria sample such that the mixed solutions are localized in limited regions of the channels.

An antimicrobial susceptibility testing system according to another embodiment of the present invention includes a substrate, a driving unit rotating the substrate, an image capture unit capturing images of limited regions of the substrate, and an image processing unit processing the images captured by the image capture unit wherein the substrate has injection holes formed so as to penetrate the upper surface thereof and channels forming passages therein through which antibiotics, a bacteria sample or mixed solutions thereof injected through the injection holes are movable and having regions where the mixed solutions are concentrated and localized by centrifugal force applied when the substrate is rotated by the driving unit.

Effects of the Invention

The method, device, and system of the present invention use centrifugal force to concentrate and localize mixed solutions of antibiotics and a bacteria sample in limited regions, advantageously enabling antimicrobial susceptibility testing even with only small amounts or extremely low concentrations of the bacteria sample.

BRIEF DESCRIPTION OF THE DRAWINGS

FIG. 1 is a cross-sectional view of an antimicrobial susceptibility testing device according to one embodiment of the present invention.

FIG. 2 is a plan view of the antimicrobial susceptibility testing device of FIG. 1.

FIG. 3 illustrates one exemplary channel of the antimicrobial susceptibility testing device of FIG. 2.

FIG. 4 illustrates a further exemplary channel of the antimicrobial susceptibility testing device of FIG. 2.

FIG. 5 illustrates another exemplary channel of the antimicrobial susceptibility testing device of FIG. 2.

FIG. 6 illustrates another exemplary channel of the antimicrobial susceptibility testing device of FIG. 2.

FIG. 7 illustrates an antimicrobial susceptibility testing method using an antimicrobial susceptibility testing device according to one embodiment of the present invention.

FIG. 8 is a conceptual diagram of an antimicrobial susceptibility testing system according to one embodiment of the present invention.

MODE FOR CARRYING OUT THE INVENTION

As the present invention allows for various changes and numerous embodiments, particular embodiments will be illustrated in drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

In describing the spirit of the present invention, detailed explanations of related art are omitted when it is deemed that they may unnecessarily obscure the essence of the present invention. In the description of the present invention, such terms as “first” and “second” are used only to distinguish one element from another.

It will also be understood that when an element is referred to as being “connected” or “coupled” to another element, it can be directly connected or coupled to the other element or intervening elements may be interposed therebetween unless expressly stated to the contrary.

The terms “-part”, “-er”, “-or”, and “-module” as used herein refer to units that process at least one function or operation and can be implemented by hardware or software such as a processor, a microprocessor, a microcontroller, a central processing unit (CPU), a graphics processing unit (GPU), an accelerated processor unit (APU), a drive signal processor (DSP), an application specific integrated circuit (ASIC) or a field programmable gate array (FPGA), or a combination of hardware and software. Each of the units may also be combined with a memory that stores data necessary to process at least one function or operation.

It is intended to clarify that components in this specification are merely distinguished from each other by their main functions. That is, two or more components to be described below may be combined into one component or one component may be divided into two or more components by their subdivided functions. It should be understood that each of the components to be described below may additionally perform some or all of the functions of other components in addition to its main function. It should also be understood that some of the main functions of components may be exclusively performed by other components.

FIG. 1 is a cross-sectional view of an antimicrobial susceptibility testing device according to one embodiment of the present invention. FIG. 2 is a plan view of the antimicrobial susceptibility testing device of FIG. 1.

Referring to FIGS. 1 and 2, the antimicrobial susceptibility testing device 10 includes a substrate 100 and a driving unit 200.

The substrate 100 includes channels 300 forming passages therein through which antibiotics, a bacteria sample or mixed solutions thereof injected through first injection holes 310 are movable.

According to one exemplary embodiment, the substrate 100 may be made of a transparent material through which the degree of growth of the bacterial strain in the bacteria sample mixed with the antibiotics can be observed from the outside.

According to one exemplary embodiment, the substrate 100 may be pretreated with $O_2$ plasma for improved hydrophilicity or gamma radiation for sterilization.

According to one exemplary embodiment, the substrate 100 may be formed in a circular shape.

The driving unit 200 applies a rotational force to the substrate 100 to rotate the substrate 100 with respect to the axis of rotation (AX-R) located at the center of rotation 305 of the substrate 100.

According to one exemplary embodiment, the driving unit 200 may include components for applying a rotational force to the substrate 100, such as a power source, a motor, and a gear.

The mixed solutions of the antibiotics and the bacteria sample injected into the channels 300 may be localized at distal ends of the channels 300 by centrifugal force applied when the substrate 100 is rotated by the driving unit 200, and limited regions where the mixed solutions are concentrated and localized may be formed at the distal ends of the channels 300.

According to one exemplary embodiment, the channels 300 may be symmetrically arranged with respect to the center of rotation 305 of the substrate 100 and the limited regions where the mixed solutions of the antibiotics and the bacteria sample are concentrated and localized may be formed at the farthest locations from the center of rotation 305.

The width (d) of the limited regions may be set depending on the concentration of the bacteria sample used in the antimicrobial susceptibility testing device 10. For example, the width (d) of the limited regions may decrease as the concentration of the bacteria sample used in the antimicrobial susceptibility testing device 10 decreases.

Detailed structures of the channels 300 will be described below with reference to FIGS. 3 to 6.

FIG. 3 illustrates one exemplary channel of the antimicrobial susceptibility testing device of FIG. 2.

Specifically, FIG. 3 illustrates a plan view of the channel 300A (top) and a cross-sectional view of the substrate 100 in which the channel 300A is formed (bottom).

The channel 300A formed in the substrate 100 includes a first region 320A to a fourth region 350A.

The first region 320A has a first injection hole 310 and a second injection hole 311 formed therein.

According to one exemplary embodiment, the first injection hole 310 may be formed so as to penetrate the upper surface of the substrate 100 and an antibiotic may be injected through the first injection hole.

According to one exemplary embodiment, the second injection hole 311 may be formed so as to penetrate the upper surface of the substrate 100 and a bacteria sample may be injected through the second injection hole.

According to one exemplary embodiment, the second injection hole 311 may be formed at a position closer to the axis of rotation of the substrate 100 (on the left side of FIG. 3) than the first injection hole 310.

According to one exemplary embodiment, the first injection hole 310 and the second injection hole 311 may be integrally formed. In this embodiment, an antibiotic and a bacteria sample can be injected into the channel 300A through the same injection hole.

According to one exemplary embodiment, one side wall (BR) of the channel 300A may be formed at a position closer to the axis of rotation of the substrate 100 (on the left side of FIG. 3) than the second injection hole 311.

According to one exemplary embodiment, a first recess 101 may be formed at a position corresponding to the first injection hole 310 on the bottom surface of the channel 300A. In this embodiment, an antibiotic injected through the first injection hole 310 can be introduced into and retained in the first recess 101. Thereafter, the antibiotic introduced into the first recess 101 can be dried. A bacteria sample injected through the second injection hole 311 can be mixed with the dried antibiotic while moving in a direction away from the axis of rotation of the substrate 100 (in the right direction in FIG. 3) by centrifugal force.

The second region 330A may include a section whose width becomes narrower toward the third region 340A such that a mixed solution of the antibiotic and the bacteria sample is transferred to the third region 340A when the applied centrifugal force is equal to or greater than a reference value.

The second region 330A may have a small width at the distal end thereof adjacent to the third region 340A such that the mixed solution is movable to the third region 340A when the applied centrifugal force is equal to or greater than a reference value.

The third region 340A may include a section whose width becomes narrower toward the fourth region 350A such that the mixed solution of the antibiotic and the bacteria sample is localized in the fourth region 350A by centrifugal force.

The third region 340A may include a section whose width becomes narrower opposite the fourth region 350A. This section can prevent the introduced mixed solution of the antibiotic and the bacteria sample from flowing backward.

The mixed solution of the antibiotic and the bacteria sample is finally concentrated and localized in the fourth region 350A by centrifugal force. Antimicrobial susceptibility testing can be conducted by observing to what extent the bacterial strain grows in the mixed solution in the fourth region 350A.

According to one exemplary embodiment, a second recess 102 may be formed at a position corresponding to the fourth region 350A on the bottom surface of the channel 300A. In this embodiment, the mixed solution of the antibiotic and the bacteria sample can be finally concentrated and localized in the fourth region 350A by centrifugal force and can be introduced into and retained in the second recess 102 by the force of gravity.

According to one exemplary embodiment, the width of the fourth region 350A may be the same as that of the third region 340A and may be uniform.

According to one exemplary embodiment, the bottom surface of the channel 300A may be inclined in a direction away from the axis of rotation of the substrate 100. In this embodiment, the channel 300A allows more effective transfer of the mixed solution of the antibiotic and the bacteria sample to the fourth region 350A.

FIG. 4 illustrates a further exemplary channel of the antimicrobial susceptibility testing device of FIG. 2.

Specifically, FIG. 4 illustrates a plan view of the channel 300B (top) and a cross-sectional view of the substrate 100 in which the channel 300B is formed (bottom).

The channel 300B illustrated in FIG. 4 is substantially the same as the channel 300A illustrated in FIG. 3, except that one side wall BR' of the channel 300B is located relatively close to a second injection hole 311.

Since one side wall BR' of the channel 300B is close to the second injection hole 311, an antibiotic injected through a first injection hole 310 and a bacteria sample injected through the second injection hole 311 can be more effectively transferred to a fourth region 350B.

FIG. 5 illustrates another exemplary channel of the antimicrobial susceptibility testing device of FIG. 2.

Referring to FIGS. 1 to 5, a third region 340C of the channel 300C further includes a section (RG-PR) protruding opposite a fourth region 350C, that is, toward a second region 330C.

The width of the fourth region 350C of the channel 300C may be larger than that of one end of the third region 340C and may be uniform.

FIG. 6 illustrates another exemplary channel of the antimicrobial susceptibility testing device of FIG. 2.

Referring to FIGS. 1 to 6, the channel 300D includes a first region 320D to a sixth region 370D.

When a mixed solution of an antibiotic and a bacteria sample contains a plurality of bacterial strains, a bacterial strain different from a bacterial strain localized in the fourth region 350D may be localized in the sixth region 370D.

The fifth region 360D connects between the fourth region 350D and the sixth region 370D.

According to one exemplary embodiment, the width of the fifth region 360D may be narrower than those of the fourth region 350D and the sixth region 370D.

According to one exemplary embodiment, the width of the fifth region 360D may be set such that bacterial strains of different sizes are localized in the fourth region 350D and the sixth region 370D. The magnitude of centrifugal force applied varies depending on the size of the bacterial strain. The width of the fifth region 360D may be set to such a level that resistance is applied to prevent movement of the bacterial strain subjected to less centrifugal force.

FIG. 7 illustrates an antimicrobial susceptibility testing method using an antimicrobial susceptibility testing device according to one embodiment of the present invention.

Referring to FIGS. 1 to 7, the antimicrobial susceptibility testing method includes injecting antibiotics into channels formed in a substrate through injection holes formed on the upper surface of the substrate and drying the antibiotics (STEP1).

The antibiotics may be introduced into and dried in recesses formed on the lower surfaces of the channels.

According to the antimicrobial susceptibility testing method, a bacteria sample is injected into and mixed with the dried antibiotics (STEP2).

According to the antimicrobial susceptibility testing method, the substrate is rotated by a driving unit to apply centrifugal force to mixed solutions of the antibiotics and the bacteria sample such that the mixed solutions are localized in limited regions of the channels (STEP3).

FIG. 8 is a conceptual diagram of an antimicrobial susceptibility testing system according to one embodiment of the present invention.

Referring to FIGS. 1 to 8, the antimicrobial susceptibility testing system 1000 includes a substrate 100 having channels formed therein, a driving unit 200, a thin film 400, an image capture unit 500, and an image processing unit 600.

According to one exemplary embodiment, the upper portion of the substrate 100 may be covered with the thin film 400. The closure of the upper portion of the substrate 100 by the thin film 400 can prevent antibiotics and a bacteria sample from escaping to the outside of the rotating substrate 100. The thin film 400 can also function as an image background that allows the image capture unit 500 to capture clear images of the bacteria.

The image capture unit 500 can capture images of mixed solutions of the antibiotics and the bacteria sample that are concentrated and localized in limited regions of the substrate 100.

According to one exemplary embodiment, the image capture unit 500 may be embodied by various forms such as a microscope (for example, an optical microscope or a miniature microscope) or a smartphone camera capable of capturing images.

The image processing unit 600 can process the bacteria images captured by the image capture unit 500 to acquire data on changes in the amount of the bacteria over time, enabling antimicrobial susceptibility testing. For example, the image processing unit 600 may evaluate the resistance of the bacteria to the antibiotics based on to what extent the bacteria grow over time.

Although the present invention has been described in detail with reference to its preferred embodiments, these embodiments do not serve to limit the invention and various modifications and variations can be made thereto by those skilled in the art without departing from the spirit and scope of the present invention as set forth in the appended claims.

The invention claimed is:

1. An antimicrobial susceptibility testing device comprising a substrate and a driving unit rotating the substrate, wherein the substrate comprises first injection holes formed so as to penetrate the upper surface thereof and channels forming passages therein through which antibiotics, a bacteria sample or mixed solutions thereof injected through the first injection holes are movable and having first regions where the mixed solutions are concentrated and localized by centrifugal force applied when the substrate is rotated by the driving unit, wherein each of the channels has a second region comprising a section whose width becomes narrower toward the first region such that the mixed solutions are localized in the first region, and wherein each of the channels has a third region comprising a section whose width becomes narrower toward the second region such that the mixed solutions are transferred to the second region when the applied centrifugal force is equal to or greater than a reference value.

2. The antimicrobial susceptibility testing device according to claim 1, wherein the second region further comprises a section whose width becomes narrower opposite the first region and which prevents the introduced mixed solution from flowing backward.

3. The antimicrobial susceptibility testing device according to claim 1, wherein the width of the first region is the same as that of one end of the second region and is uniform.

4. The antimicrobial susceptibility testing device according to claim 1, wherein the width of the first region is larger than that of one end of the second region and is uniform.

5. The antimicrobial susceptibility testing device according to claim 1, wherein the second region further comprises a section protruding opposite the first region.

6. The antimicrobial susceptibility testing device according to claim 1, wherein when the mixed solution contains a plurality of bacterial strains, the channel has a fourth region in which a bacterial strain different from a bacterial strain localized in the first region is localized.

7. The antimicrobial susceptibility testing device according to claim 6, wherein each of the channels comprises a fifth region connecting between the first region and the fourth region.

8. The antimicrobial susceptibility testing device according to claim 7, wherein the width of the fifth region is narrower than those of the first region and the fourth region.

9. The antimicrobial susceptibility testing device according to claim 8, wherein the width of the fifth region is set such that bacterial strains of different sizes are localized in the first region and the fourth region.

10. The antimicrobial susceptibility testing device according to claim 1, further comprising second injection holes formed so as to penetrate the upper surface of the substrate.

11. The antimicrobial susceptibility testing device according to claim 10, wherein the second injection holes are formed at positions closer to the axis of rotation of the substrate than the first injection holes through which the antibiotics are injected, and the bacteria sample is injected through the second injection holes.

12. The antimicrobial susceptibility testing device according to claim 1, wherein recesses are formed at positions corresponding to the first injection holes on the bottom surfaces of the channels.

13. The antimicrobial susceptibility testing device according to claim 1, wherein recesses are formed at positions corresponding to the first regions on the bottom surfaces of the channels.

14. An antimicrobial susceptibility testing method comprising:

injecting antibiotics into channels formed in a substrate and drying the antibiotics; mixing a bacteria sample with the dried antibiotics injected into the channels; and rotating the substrate to apply centrifugal force to the mixed solutions of the antibiotics and the bacteria sample such that the mixed solutions are localized in first regions of the channels, wherein each of the channels has a second region comprising a section whose width becomes narrower toward the first region such that the mixed solution is localized in the first region, and wherein each of the channels has a third region comprising a section whose width becomes narrower toward the second region such that the mixed solution is transferred to the second region when the applied centrifugal force is equal to or greater than a reference value.

15. An antimicrobial susceptibility testing system comprising a substrate, a driving unit rotating the substrate, an image capture unit capturing images of first regions of the substrate, and an image processing unit processing the images captured by the image capture unit wherein the substrate has injection holes formed so as to penetrate the upper surface thereof and channels forming passages therein through which antibiotics, a bacteria sample or mixed solutions thereof injected through the injection holes are movable and having first regions where the mixed solutions are concentrated and localized by centrifugal force applied when the substrate is rotated by the driving unit, wherein each of the channels has a second region comprising a section whose width becomes narrower toward the first region such that the mixed solution is localized in the first region, and wherein each of the channels has a third region comprising a section whose width becomes narrower toward the second region such that the mixed solution is transferred to the second region when the applied centrifugal force is equal to or greater than a reference value.

* * * * *